US005828368A

United States Patent [19]

Jung

[11] Patent Number: 5,828,368

[45] Date of Patent: Oct. 27, 1998

[54] START PULSE VERTICAL SIGNAL GENERATOR USING A DATA ENABLE SIGNAL FOR PRECHARGING

[75] Inventor: Tae-Bo Jung, Yongin-gun, Rep. of Korea

[73] Assignee: Samsung Electronics Co., Ltd., Kyungki-do, Rep. of Korea

[21] Appl. No.: 757,819

[22] Filed: Nov. 27, 1996

[30] Foreign Application Priority Data

Nov. 28, 1995 [KR] Rep. of Korea .................. 1995-44308

[51] Int. Cl.[6] ........................................................ G06F 3/14

[52] U.S. Cl. ................................ 345/213; 345/92; 345/99

[58] Field of Search .................................... 345/3, 92, 99, 345/213

[56] References Cited

U.S. PATENT DOCUMENTS

| | | | |
|---|---|---|---|
| 4,626,837 | 12/1986 | Priestly | 345/204 |
| 5,111,190 | 5/1992 | Zenda | 345/3 |
| 5,179,692 | 1/1993 | Inoue | 395/500 |
| 5,396,258 | 3/1995 | Zenda | 345/3 |
| 5,475,402 | 12/1995 | Hijikata | 345/211 |
| 5,515,080 | 5/1996 | Nakamura et al. | 345/189 |
| 5,592,187 | 1/1997 | Zenda | 345/3 |

*Primary Examiner*—Steven J. Saras
*Assistant Examiner*—Vincent E. Kovalick
*Attorney, Agent, or Firm*—Sughrue, Mion, Zinn, Macpeak & Seas, PLLC

[57] ABSTRACT

A start pulse vertical signal generator using a data enable signal for precharging is disclosed. A clock pulse vertical (CPV) signal generator generates a CPV signal by counting a main clock signal and a data enable signal. A pulse signal generator generates reset pulse signals and delayed pulse signals by using a data enable signal and the CPV signal. A pre-start pulse vertical (STV) signal generator generates an STV signal by using the CPV signal and reset pulse signals and delayed pulse signals. Accordingly, the present invention generates the pre-STV signal two clock pulses of the CPV signal before the data enable signal DE is generated.

7 Claims, 7 Drawing Sheets

START PULSE VERTICAL SIGNAL GENERATOR USING A DATA ENABLE SIGNAL FOR PRECHARGING

BACKGROUND OF THE INVENTION

The present invention relates to a start pulse vertical signal generator using a data enable signal for precharging, and more particularly to a start pulse vertical generator which increases the operating speed of a gate.

DESCRIPTION OF THE RELATED ART

Generally, a personal computer controls a display with control signals. The control signals can be a vertical synchronous signal (Vsync), a horizontal synchronous signal (Hsync), a main clock signal and color signal. A synchronous mode is a mode in which many kinds of signals are generated based on the vertical synchronous signal and the horizontal synchronous signal for controlling data. A data enable mode is a mode in which many kinds of signals are generated based on a data enable signal for controlling data.

While some personal computer makers provide a vertical synchronous signal, a horizontal synchronous signal, and a data enable signal, other personal computer manufacturers provide only a data enable signal. Although, manufacturers always provide a main clock signal and a data enable signal.

The vertical synchronous signal is the signal which controls a vertical line of a display device, and the horizontal synchronous signal is the signal which controls a horizontal line of the display device.

Generally a synchronous signal is the signal which controls a monitor and a data enable signal is the signal which controls a flat panel type display.

A monitor employs an electronic gun which displays information one-dimensionally. A liquid crystal display panel displays information two-dimensionally by row and column electrode drivers.

As shown in FIGS. 3 and 4, a basic input/output system, BIOS, is applied to both synchronous (sync) mode and data enable mode systems. The BIOS allows a data output point to vary based on a specified number of clock cycles in the synchronous and data enable modes. This capability of the BIOS to vary the data output point enables various systems, which use different clock cycle specifications, to output data.

In the sync mode shown in FIG. 4, data 1 is produced after the occurrence of three main clock cycles once a horizontal synchronous signal starts sending. If other personal computer manufacturers produce the data 1 after the occurrence of a horizontal synchronous signal and four main clock signals, the user must adjust the BIOS.

A clock pulse vertical signal is used in a Video Graphic Array mode, and the available number of pixels are equal to (640 (columns) *480 (rows)*RGB). However, since a control signal includes a blank section, the number of pixels is equal to the number of main clock signals which is (800*525), which is larger than the available number of pixels.

When an electronic gun scans the display data, the blank section corresponds to the flyback line time in a horizontal direction and in a vertical direction. During this time period, although the image data is input, the data is not displayed.

One horizontal synchronous signal is comprised of 800 main clock signals, and one vertical synchronous signal is comprised of 525 horizontal synchronous signals.

Signals associated with one horizontal synchronous signal are generated from a main clock signal. However, in the case of using a main clock signal, when signals associated with one vertical synchronous signal are generated, (800*525) clock cycles are required. Accordingly, a horizontal synchronous signal is not needed. Therefore signals associated with one vertical synchronous signal are generated from a clock pulse vertical signal which has the same period as the horizontal synchronous signal.

The clock pulse vertical signal is a standard signal for operating a gate driver integrated circuit, and it connects all the signals with the gate signal.

Generally, a data enable signal and a main clock signal are generated in an LCD, and other signals which are needed are generated from these signals.

As shown in FIG. 1, since a clock pulse drives an LCD gate driver, a clock pulse vertical signal (CPV) and a start pulse vertical signal (STV) are used to denote the driving start point of a gate driver.

One STV signal and two CPV signals are generated before the main STV signal is generated. The first STV signal precharges the gate of an LCD and increases the driving velocity of a main STV signal. Consequently the gate is driven at an accurate point in time.

As shown in FIG. 2, an Vsync signal is used to generate an STV signal, and the pre-STV signal is generated later after the time constant T of the Vsync signal. However, the time constant T differs from manufacturer to manufacturer. More particularly, while a pre-STV signal is generated based on a Vsync signal, which is standardized, generating the point at which a pre-STV signal differs in the BIOS of each manufacturer's product. In addition, the BIOS differs from each manufacturer, therefore generation of the point at which a pre-STV signal is activated will be setup in the BIOS for each manufacturer's product.

A conventional method for generating an STV signal and a BIOS correction method will now be described.

Referring to FIGS. 5 and 8, an STV signal for precharging has to be generated by counting from a Vsync low pulse signal because effective data is output at POINT A. Therefore, when a system design has n fixed at 100 and n must be 150, the BIOS must be changed to change n from 100 to 150.

Also, referring to FIG. 3, if n is fixed in a circuit design at 100, after a Vsync signal is generated an STV signal is generated after 102 (n+2) CPV signals. Since the circuit is comprised of hardware once it is designed to generate an STV signal after 102 CPV pulses, it is fixed until the circuit can be redesigned. In such a case the BIOS's value should be changed. Further, the number n is always changed to be equal to a system design. Consequently the conventional method discussed above needs a setup process to be redesigned, since it is troublesome.

SUMMARY OF THE INVENTION

In view of the above, it is an object of the present invention to provide a start pulse vertical generator in which the BIOS does not need to be setup by generating a pre-STV signal using a data enable signal.

To achieve the above-mentioned object, according to a preferred embodiment of the present invention, a start pulse vertical signal generator using a data enable signal for precharging, comprising: a clock pulse vertical signal generator for generating a clock pulse vertical (CPV) signal by counting a main clock signal and a data enable signal; a pulse signal generator for generating reset pulse signals and delayed pulse signals by delaying the data enable signal and by counting the CPV signal; and a precharging start pulse vertical (STV) signal generator for generating a precharging start pulse vertical (pre-STV) signal by counting the CPV signal, reset pulse signals and delayed pulse signals.

Also to achieve the above-mentioned object, according to the preferred embodiment of the present invention, a gate driving method of a TFT LCD, comprising: counting a first number of clock pulse vertical (CPV) signals during a BLANK section of a data enable signal delayed by at least one period; saving the count value of the counted number of CPV signals; counting a second number of CPV signals from the start of another BLANK section of the data enable signal delayed by at least one period; and generating a start pulse vertical (STV) signal when the second number of CPV signals counted equals the saved count value.

DETAILED DESCRIPTION OF THE PREFERRED EMBODIMENT

A preferred embodiment of the present invention is described below with reference to the accompanying drawings.

Figure 1:
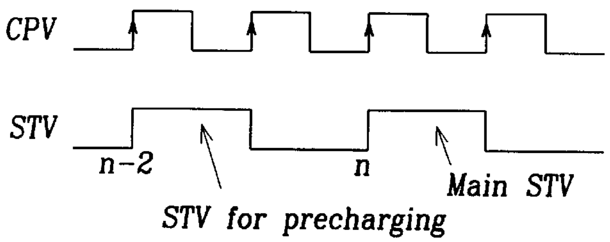
FIG. 1 shows a timing chart of an STV signal and a CPV signal.
Figure 2:
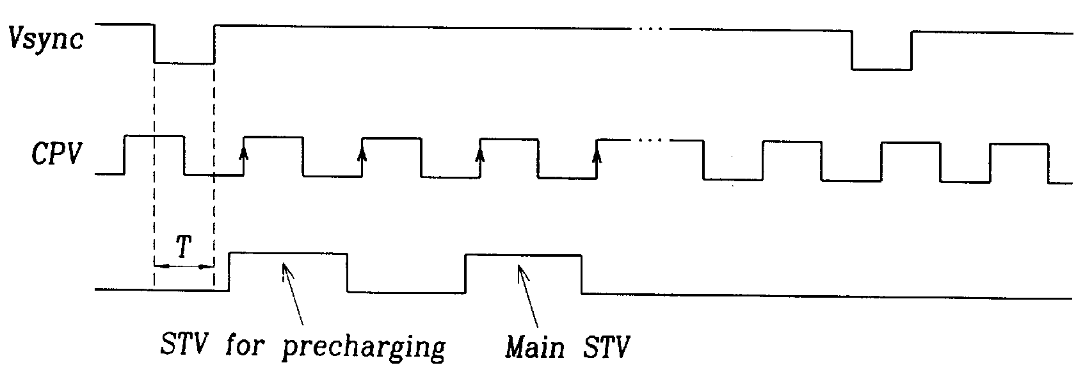
FIG. 2 shows a timing chart of a process for generating an STV signal using a Vsync signal.
Figure 3:
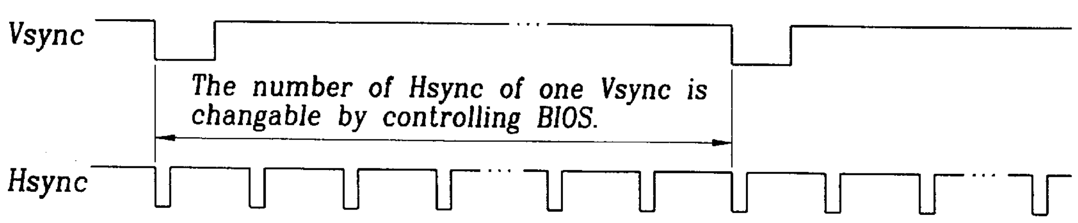
FIGS. 3 to 4 show a timing chart of between the vertical sync signal and horizontal sync signal, and the horizontal sync signal and main clock signal, respectively, which are related to the BIOS.
Figure 4:
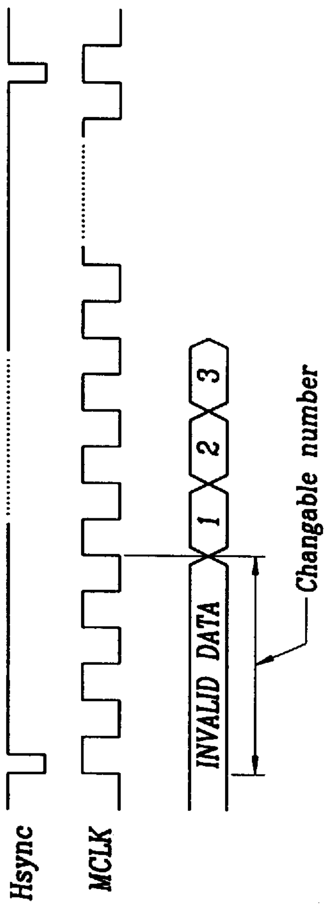
Figure 5:
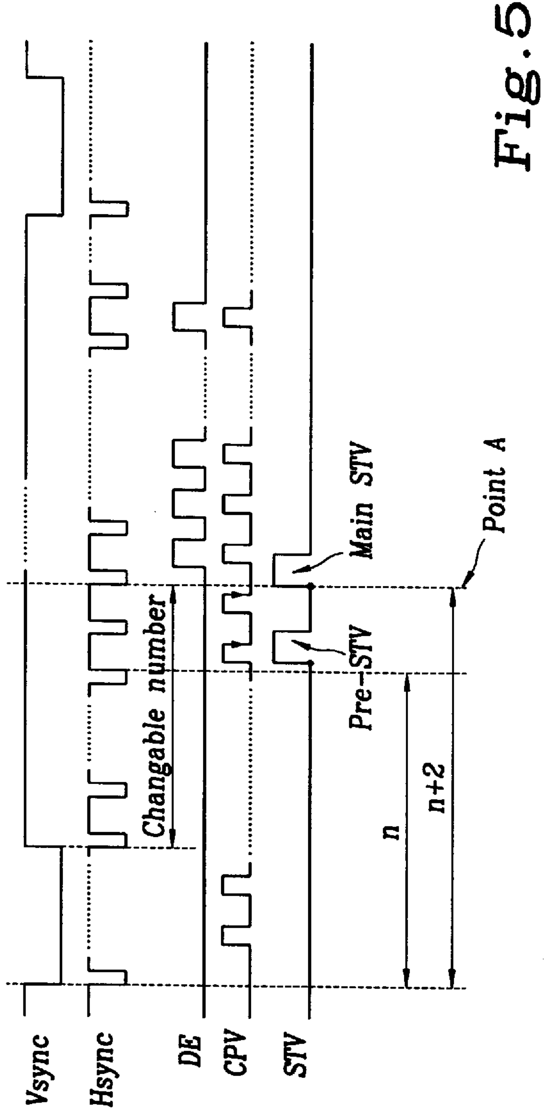
FIG. 5 shows a timing chart of a correction method according to a prior pre-charge signal generation process and based on the BIOS.
Figure 6:
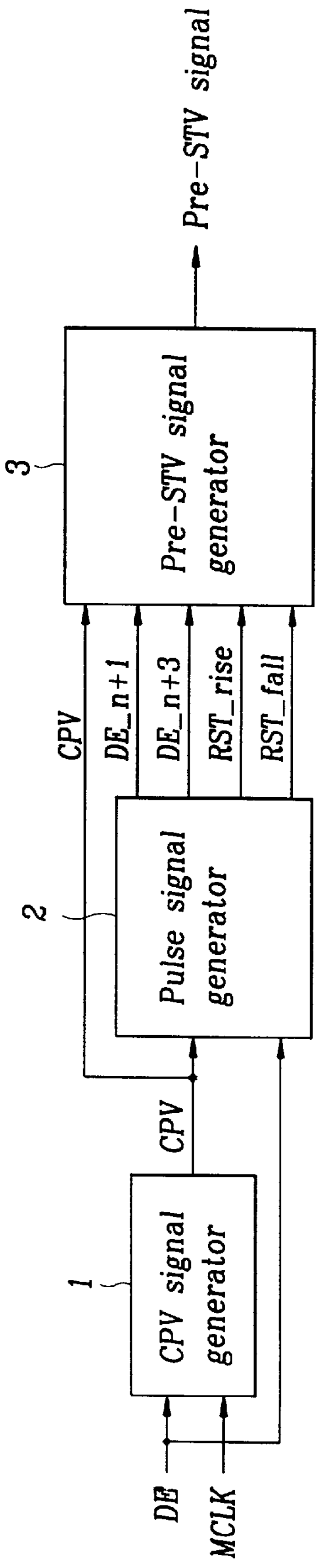
FIG. 6 shows a block diagram of a start pulse vertical signal generator using a data enable signal for precharging.

FIG. 6 represents a start pulse vertical signal generator that uses a data enable signal for precharging, and which includes a CPV signal generator 1 for generating a CPV signal by counting a main clock signal (MCLK) and a data enable signal (DE); a pulse signal generator 2 for generating several pulse signals DE__n+1, DE__n+3, RST__rise and RST__fall by using the data enable signal DE and the CPV signal; and an STV signal generator 3 for generating an STV signal by using the CPV signal and the signals DE__n+1, DE__n+3, RST__rise and RST__fall.

Figure 7:
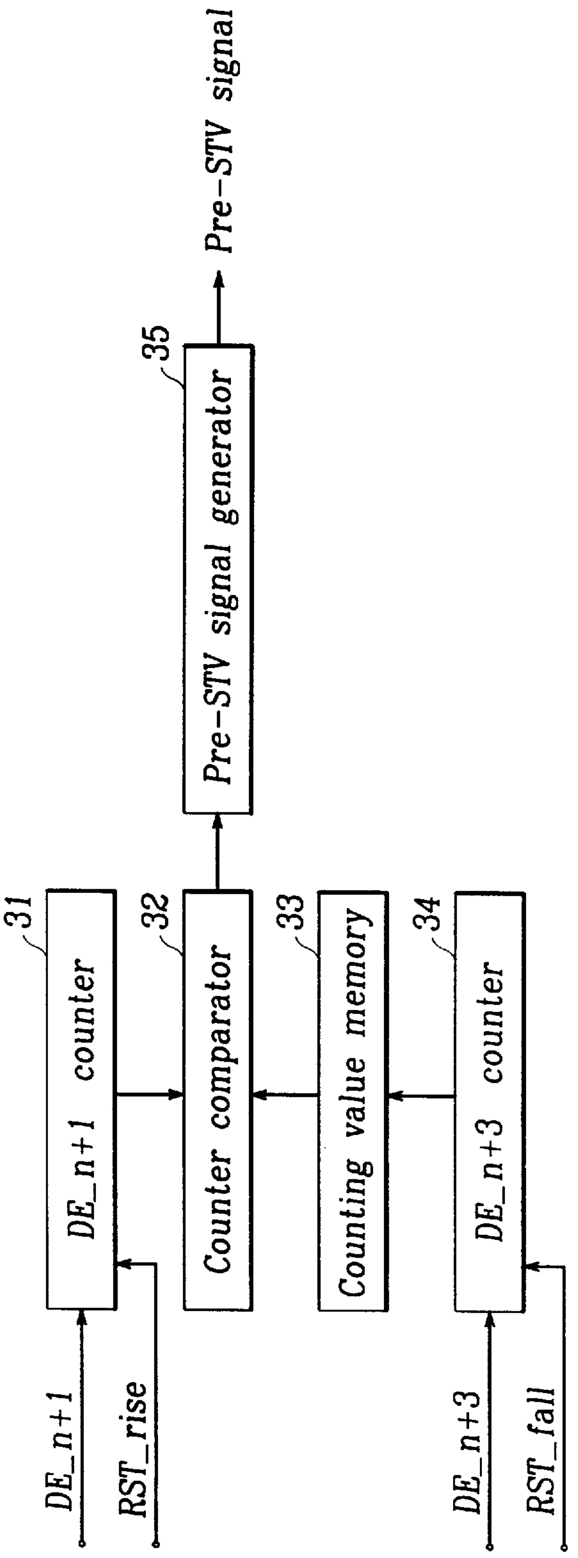
FIG. 7 shows a detailed diagram of an STV signal generating means.

FIG. 7 shows in detail the STV signal generator 3, which includes a DE__n+1 counter 31 for counting during a BLANK section of the DE__n+1 signal, which corresponds to the data enable signal DE delayed by one clock pulse of the CPV signal based on the reset signal RST__rise; a DE__n+3 counter 34 for counting during the section of the DE signal which is two CPV clock pulses shorter than the BLANK section of the DE signal, based on the reset signal RST__fall and the DE__n+3 signal, which is the data enable signal DE delayed by three CPV clocks pulses; a counter value memory 33 for storing a count value of DE__n+3 counter 34; a counter comparator 32 for outputting a pulse signal indicating whether the count value of counter value memory 33 is in accordance with the counting value; and an STV signal generator 35 for generating a pre-STV signal using the pulse signal output from counter comparator 32.

First, a fundamental aspect of the present invention is described.

Figure 9:
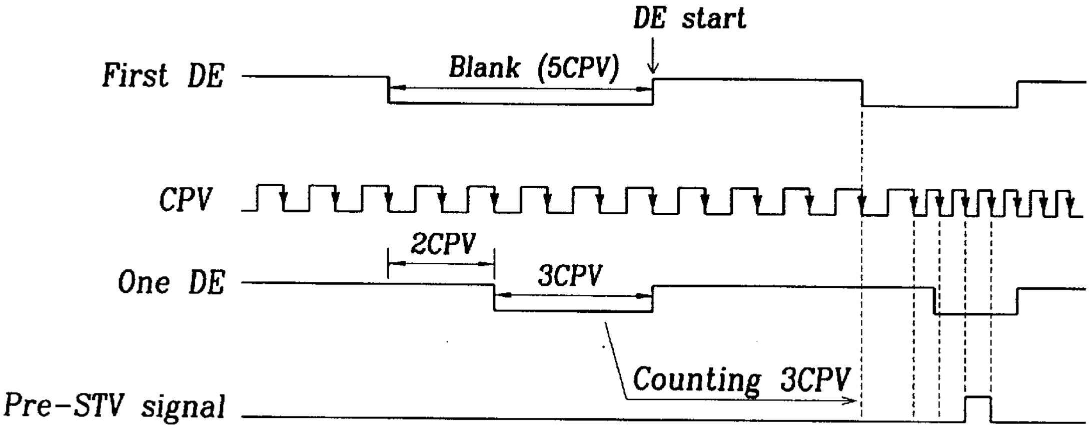
FIG. 9 shows an operational item diagram of a start pulse vertical signal generator using a data enable signal for precharging.

As shown in FIG. 9, a fundamental aspect of the present invention is to generate the pre-STV signal two clock pulses of the CPV signal before the data enable signal DE is generated.

Figure 10:
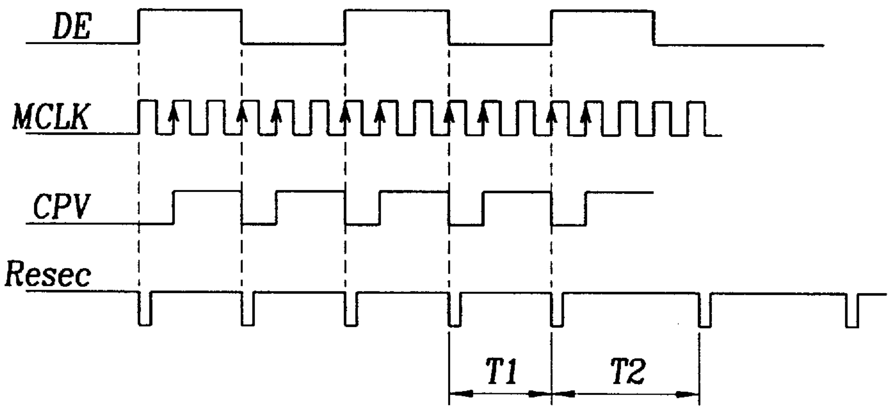
FIG. 10 shows a timing chart of many kinds of signals used in generation of the CPV signal including using the data enable signal.

In the case of generating a CPV signal using a data enable signal DE, the counter is started counting at the rising edge, and either the rising edge or falling edge is generated after a predetermined amount of time, and another edge of a CPV signal is generated before the rising edge of data enable signal DE is input. This process is shown in FIG. 10.

The CPV signal period T1 of the section of the data enable signal DE is equal to the period of a data enable signal DE or to the period of an Hsync signal. The CPV signal period of the BLANK section can be equal to T1. However, it is more effective if the CPV signal period of the BLANK section is equal to one period (in the case of a 10 bit counter, there are 1024 main clock signals) of counter T2 which generates the CPV signal which is employed in the present invention.

Further, when a first data enable signal DE and a CPV signal are input, even though the CPV signal of a BLANK section may change, the pre-STV signal is always generated previous to the data enable signal by two CPV signals.

First, one data enable signal corresponding to a blank section is generated, which is shorter than the first blank section of a data enable signal. The number of CPV pulse signals (e.g., 3 CPVs) during the blank section of the one data enable signal is counted and saved. Then, after counting the number of CPV pulse signals of the blank section of the one data enable signal, the same number of CPV pulse signals are counted beginning from the next blank section of the first data enable signal. Once that number of CPV signals are counted a pulse signal is generated. Consequently, even though the number of CPV pulse signals of a BLANK section change, the pre-STV signal is always generated before a data enable signal by two CPV signals.

Figure 8:
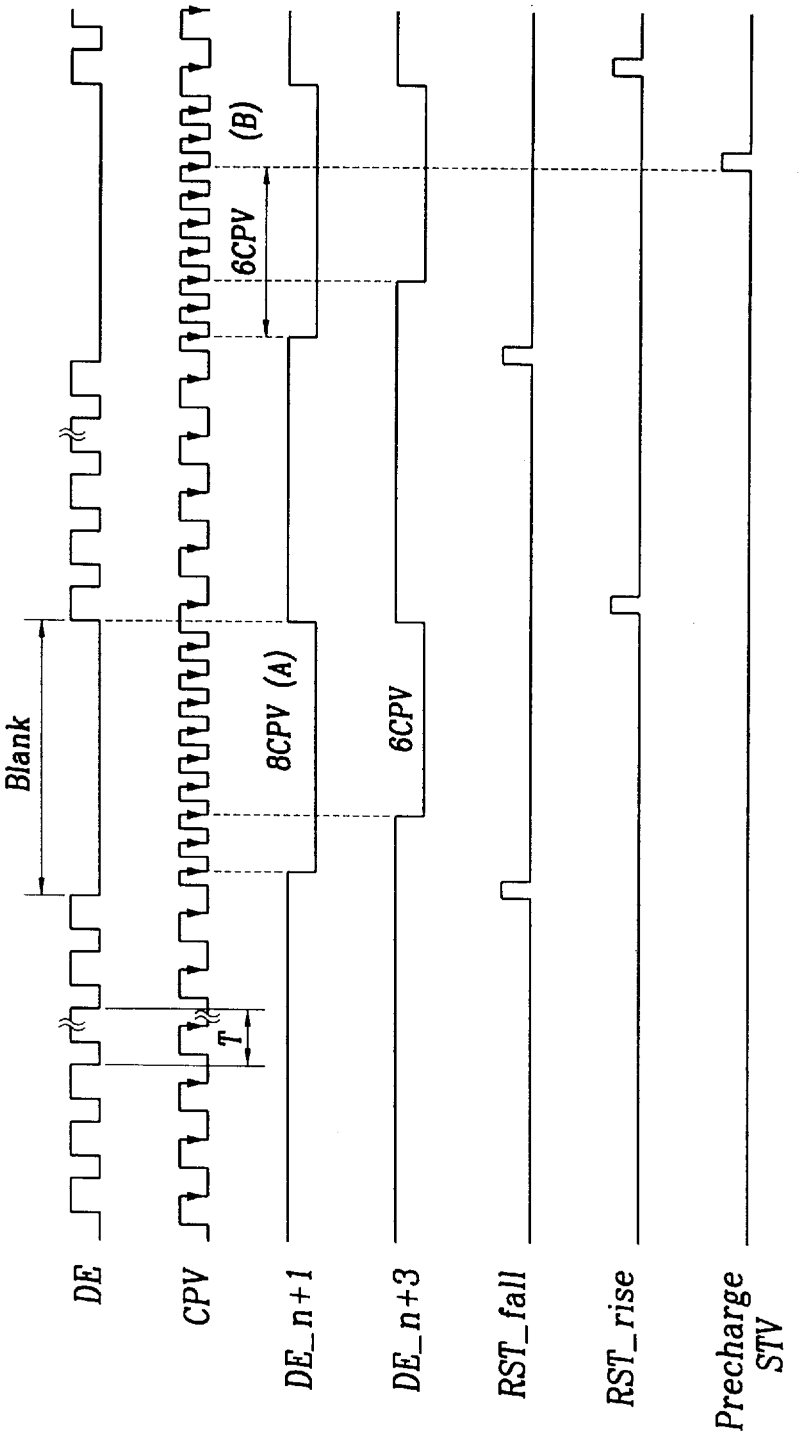
FIG. 8 shows a timing chart of reset pulse signals and delayed pulse signals used by the start pulse vertical signal generator which uses a data enable signal for precharging.

Once power is applied by a user, the pre-STV generator begins operating. At this time a data enable signal DE, as shown in FIG. 8, and a main clock signal MCLK are input to a CPV signal generator 1, shown in FIG. 6, which generates a CPV signal which is also shown in FIG. 8. Then, as shown in FIG. 8, the CPV signal output from CPV signal generator 1 and main clock signal MCLK are input to a pulse signal generator 2. Pulse signal generator 2 generates several pulse signals, namely, DE__n+1, DE__n+3, RST__rise and RST__fall, which are shown in FIG. 8.

The reset signal RST__rise and the signal DE__n+1, which is the enable signal DE delayed by one clock pulse of the CPV signal, is input to a DE__n+1 counter 31. The DE__n+1 counter 31 counts during a BLANK section of the CPV signal. At this time a reset signal RST__fall and the signal DE__n+3, which is the enable signal DE delayed by three clocks pulses of the CPV signal, is input to DE__n+3 counter 34 which counts during the section of the DE signal which is two CPV clock pulses shorter than a BLANK section of the DE signal. A counter value memory 33 saves the count value of the DE_n+3 counter 34. The DE_n+1 counter 31 begins counting CPV clock pulses again, at the beginning of the next DE_n+1 signal. Counter comparator 32 compares the DE_n+1 count value with the count value stored in counting value memory 33, and when the values are equal counter comparator 32 generates a precharge STV signal as shown in FIG. 8. Accordingly, STV signal generator 35 generates a precharge, or pre-STV signal using the pulse signal output from the counter comparator 32.

Consequently, the effects of such a start pulse vertical signal generator using a data enable signal for precharging can be summarized in that the pre-STV signal increases the operating speed of a gate by precharging the gate of a panel, such as a thin-film technology (TFT) liquid crystal display (LCD).

While only certain embodiments of the invention have been specifically described herein, it will apparent that numerous modifications may be made thereto without departing from the spirit and scope of the invention.

What is claimed is:

1. A start pulse vertical signal generator using a data enable signal for precharging, comprising:

a clock pulse vertical signal generator for generating a clock pulse vertical (CPV) signal by counting a main clock signal and a data enable signal;

a pulse signal generator for generating reset pulse signals and delayed pulse signals by delaying the data enable signal and by counting the CPV signal; and a precharging start pulse vertical (STV) signal generator for generating a precharging start pulse vertical (pre-STV) signal by counting the CPV signal, reset pulse signals and delayed pulse signals.

2. The generator according to claim 1, wherein said reset pulse signals and delayed pulse signals generator generates pulse signals DE_n+1, DE_n+3, RST_rise, RST_fall by using a data enable signal and the clock pulse vertical signal, wherein DE_n+1 corresponds to the data enable signal delayed by one pulse of the CPV signal, DE_n+3 corresponds to the data enable signal delayed by three pulses of the CPV signal, RST_rise is a reset rise signal and RST_fall is a reset fall signal.

3. The generator according to claim 1, wherein said precharging STV signal generator generates the pre-STV signal two clock pulses of the CPV signal before the data enable signal.

4. The generator according to claim 2, wherein said precharging STV signal generator comprises:

a DE_n+1 counter for counting during a BLANK section of the data enable signal based on the reset signal RST_rise and the DE_n+1 signal;

a DE_n+3 counter for counting during a section of the data enable signal which is two clock pulses of the CPV signal shorter than the BLANK section of the data enable signal, wherein said DE_n+3 counter counts based on the reset signal RST_fall and the DE_n+3 signal;

a counter value memory for storing the count value of said DE_n+3 counter;

a counter comparator for generating a pulse signal indicating whether the count value stored in the counter value memory equals a count value of said DE_n+1 counter, wherein the pulse signal generated by said counter comparator is output to said precharging STV signal generator for generating the pre-STV signal.

5. The generator according to claim 1, wherein said precharging start pulse vertical (STV) signal generator includes a counter for counting a number of pulses of the CPV pulse signal during a blank section of a delayed data enable signal, wherein the blank section of the delayed data enable signal corresponds to a first BLANK section of the data enable signal, saving the counted value, counting the CPV pulse signal beginning at a next BLANK section of the data enable signal and generating the pre-STV signal when the counter reaches the saved count value, wherein regardless of the number of pulses of the CPV pulse signal during a BLANK section of the data enable signal, the pre-STV signal is always generated two pulses of the CPV signal prior to the data enable signal.

6. The generator according to claim 5, wherein the number of pulses of the CPV pulse signal counted by said counter during the blank section of a delayed data enable signal is three.

7. A gate driving method of a TFT LCD, comprising:

counting a first number of clock pulse vertical (CPV) signals during a BLANK section of a data enable signal delayed by at least one period;

saving the count value of the counted number of CPV signals;

counting a second number of CPV signals from the start of another BLANK section of the data enable signal; and generating a start pulse vertical (STV) signal when the second number of CPV signals counted equals the saved count value.

* * * * *